United States Patent [19]

Tischer

[11] 4,371,002

[45] Feb. 1, 1983

[54] HYDROSTATIC STEERING SYSTEM

[75] Inventor: Werner Tischer, Bobingen, Fed. Rep. of Germany

[73] Assignee: Zahnradfabrik Friedrichshafen, AG., Friedrichshafen, Fed. Rep. of Germany

[21] Appl. No.: 115,674

[22] Filed: Jan. 28, 1980

[30] Foreign Application Priority Data

Feb. 3, 1979 [DE] Fed. Rep. of Germany ....... 2904111

[51] Int. Cl.³ .............................................. F15B 13/04
[52] U.S. Cl. ................................. 137/625.3; 60/384; 137/625.69; 251/324
[58] Field of Search .................. 137/625.3, 625.69; 251/324; 60/384

[56] References Cited

U.S. PATENT DOCUMENTS

| 3,255,778 | 6/1966 | Rosebrook | 137/625.69 |
| 3,405,735 | 10/1968 | Adams | 137/625.69 |
| 3,721,266 | 3/1973 | Ikebe et al. | 137/625.69 |
| 3,971,216 | 7/1976 | Miller | 137/596.13 X |
| 4,020,748 | 5/1977 | Lang | 137/596.13 X |
| 4,050,247 | 9/1977 | Connett | 137/625.69 X |
| 4,089,169 | 5/1978 | Miller | 137/596.13 X |
| 4,174,612 | 11/1979 | Liebert | 60/384 |

FOREIGN PATENT DOCUMENTS 2334365  1/1975  Fed. Rep. of Germany ..................... 137/625.69

Primary Examiner—Gerald A. Michalsky
Attorney, Agent, or Firm—Zalkind & Shuster

[57] ABSTRACT

Passage bridging cavities formed in a steering gear housing communicate with annular grooves in a cylindrical valve element through recesses in the cavities at limited, and angularly spaced valve edge locations to control distribution of pressurized fluid in a hydrostatic power steering system in response to axial and rotational movement of the valve element.

2 Claims, 6 Drawing Figures

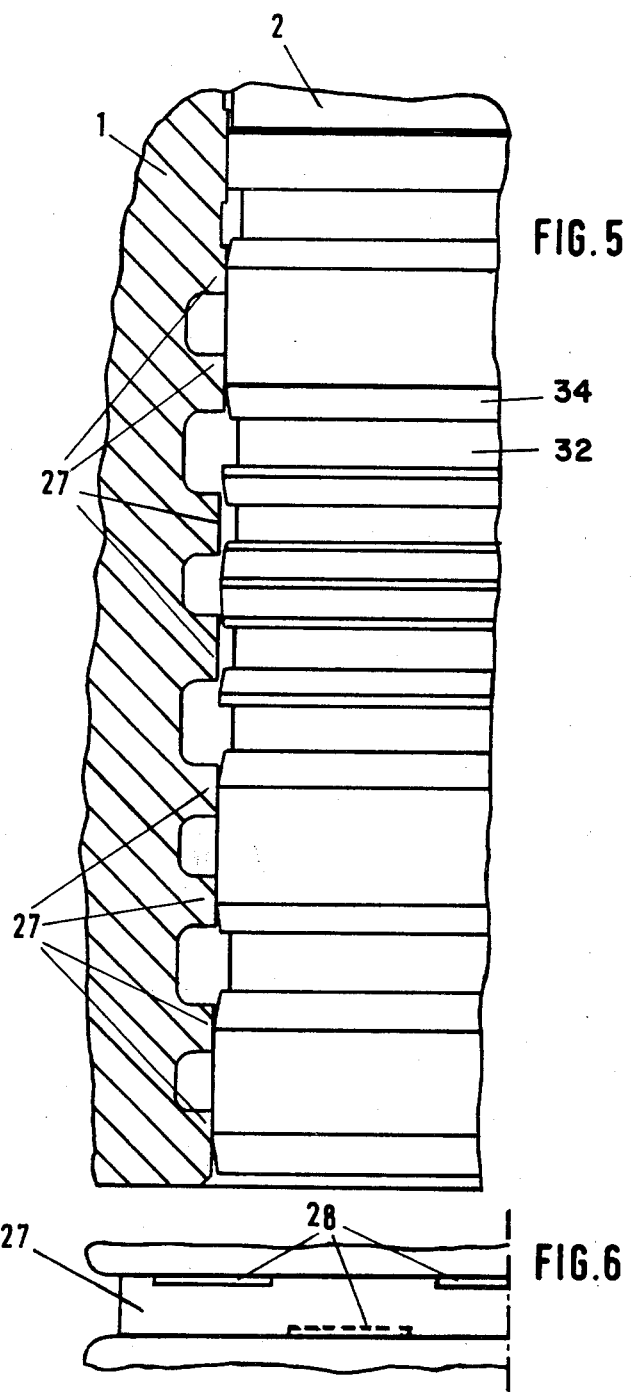

HYDROSTATIC STEERING SYSTEM

BACKGROUND OF THE INVENTION

This invention relates to a hydrostatic steering system having an axially shiftable valve piston rotatably mounted in a steering gear housing to control distribution of pressurized fluid to a fluid powered steering motor.

A steering system of the foregoing type, described for example in German Pat. OS No. 27 12 290, has a rotor gear pump acting as a fluid metering device and a high pressure pump acting as a hydrostatic power source. The gear pump, also referred to as a hand-operated pump, is supplied with the pressurized fluid through annular grooves in response to angular displacement and axial shifting of the valve piston by a driver pin fixed to the steering spindle. Depending on the direction of rotation of the steering spindle, one of the pressure chambers associated with an operating cylinder motor is pressurized in order to effect power operated vehicle steering. Passage bridging cavities between cooperating annular grooves in the valve piston and passages in the steering gear housing, serve as control edges and to seal high and low pressure regions from each other. Leakage losses are unavoidable in the steering mechanism of the aforementioned type. The leakage losses result from a fluid coated peripheral surface on the valve piston and depend on the diameter and width of the passage bridging cavity.

SUMMARY OF THE INVENTION

In accordance with the present invention, leakage losses are reduced by providing the passage bridging cavities in the steering gear housing with a few angularly spaced recesses distributed over the periphery of the valve piston and cooperating with annular grooves to form valve controlling edges at limited portions of the passage bridging cavities. Thus, the valve edges ordinarily formed between the passage bridging cavities in the steering gear housing and the outer periphery of the valve piston, are limited to a few locations at which the angularly spaced recesses are disposed. Therefore, the passage bridging cavities will require a somewhat larger transverse width without any increase in longitudinal length of the steering mechanism. Except for the few recesses, the entire circumferential extent of the passage bridging cavity remains available for pressure sealing purposes. It is merely required that the recesses provided are sufficient for the passage of an adequate volume of pressurized fluid. The desired fluid operating characteristic is maintained unchanged by appropriate dimensioning of the annular bevels in the valve piston. The operating characteristic will not be adversely influenced by the limited use of recesses in the passage bridging cavities of the steering gear housing. Generally, two to four recesses distributed over the valve piston periphery for each cooperating annular groove has been found to be suitable.

According to one advantageous embodiment, the recesses in the passage bridging cavities of the steering gearing housing are formed as stepped ledges to preserve laminar flow and avoid noise produced by turbulence.

Simplification and cost reduction in the manufacture of the steering mechanism may be achieved in accordance with the present invention by providing the aforementioned recesses in the passage bridging cavities of the steering gear housing. If necessary, a single passage bridging cavity may serve two control functions without impairing its pressure sealing capability. This is accomplished according to the present invention by providing the passage bridging cavities in the steering gear housing with recesses at both axial sides, the recesses on one side being angularly spaced from the recesses on the other side. Except for the recesses, the full width of the passage bridging cavity remains available for sealing purposes despite the provision of valve edges on both axial sides thereof. Formation of the recesses in the passage bridging cavities may be effected by different manufacturing techniques including plunge-milling and eccentric turning. Cross reference is made to an application filed Jan. 22, 1980 in the name of Armin Lang, Ser. No. 114,388, now U.S. Pat. No. 4,313,467, for control value.

BRIEF DESCRIPTION OF DRAWINGS

Specific embodiments of the invention are hereinafter described in greater detail with reference to the accompanying drawings from which additional aspects of the invention will become apparent and wherein:

FIG. 5 is a partial section view taken substantially through a plane indicated by Section V—V in FIG. 2.

FIG. 6 is a partial planar projection view of a housing mounted passage bridging cavity at a location indicated by the arrow in FIG. 4.

DETAILED DESCRIPTION OF PREFERRED EMBODIMENTS

Figure 1:
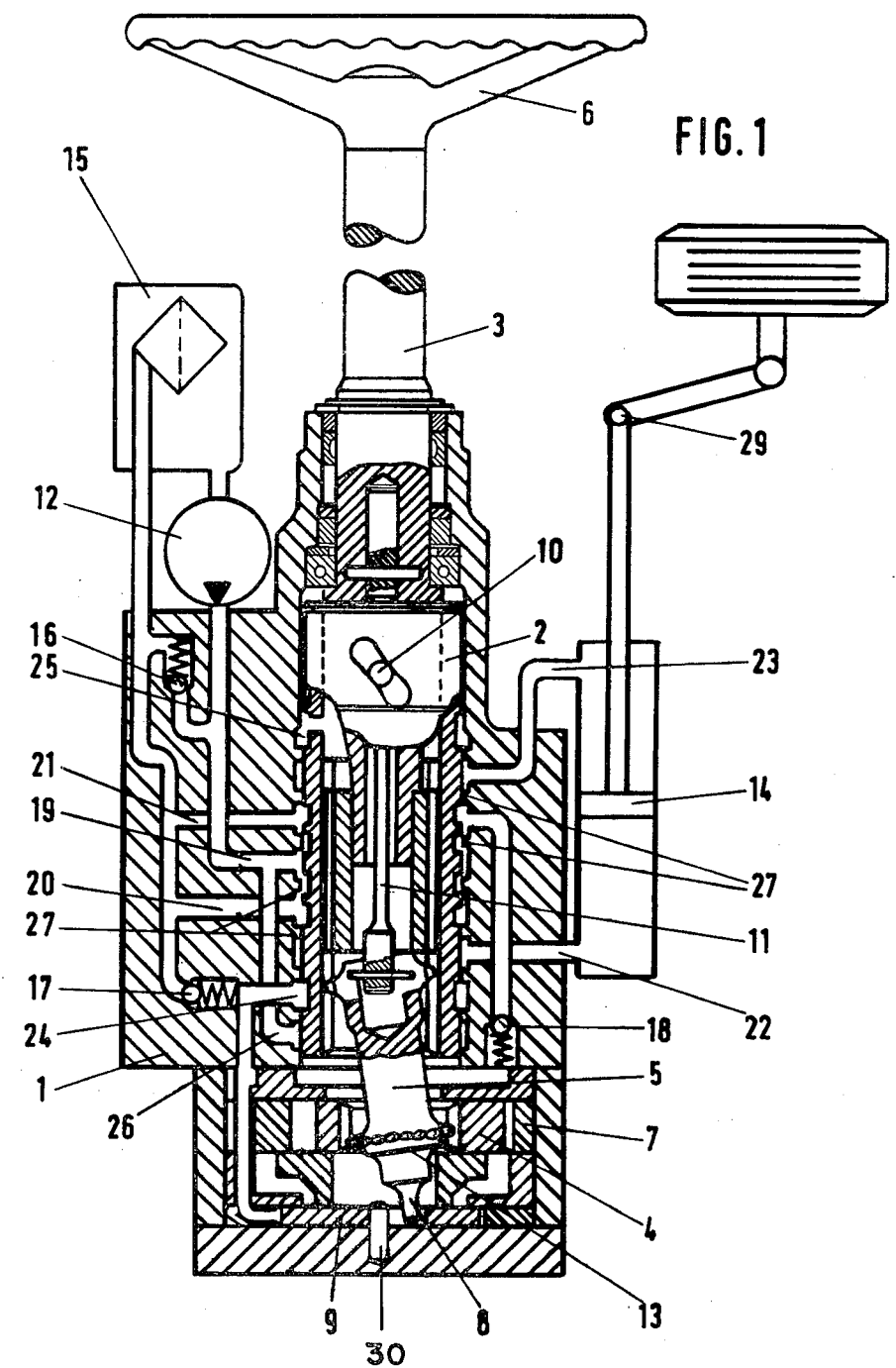
FIG. 1 is a side sectional view through a steering mechanism constructed in accordance with the present invention.

Referring now to the drawings in detail, FIG. 1 illustrates a hydrostatic steering mechanism which includes an axially shiftable valve piston 2 rotatably mounted in a steering gear housing 1. The valve piston has an inner longitudinal bore through which a torsion rod 11 extends. The torsion rod is connected to a steering spindle 3. An externally toothed rotor 4 of a hand-operated gear pump 13 is driven through coupling shaft 5 which is connected to a steering wheel 6 through the torsion rod 11 and the steering spindle 3. The rotor 4 is mounted in mesh with internal teeth of a stator 7 and executes a planetary movement when rotated through shaft 5. The shaft 5 also drives a plate cam 9 by means of a driver pin 8. The cam 9 is thereby rotated in synchronism with the rotor 4 about the longitudinal axis of the steering gear housing 1 established by a bearing pin 30.

The control valve for establishing distribution of pressure medium, usually oil, is formed by the steering gear housing 1 and the valve piston 2. The valve piston when rotated by the steering spindle 3 is axially shifted in one direction corresponding to the direction of rotation of spindle 3 from a central position. The axial movement of the valve piston 2 is effected by a driver pin 10 on the steering spindle engaged in a diagonal groove formed in the valve piston. Relative angular movement between the steering spindle 3 and shaft 5 occurs as a result of elastic twist of torsion rod 11. The torsion rod is coupled at opposite axial ends thereof to the shaft 5 and the steering spindle 3 by means of coupling pins as shown. The shaft 5 is also connected to the valve piston 2 by means of coupling teeth as shown in FIG. 1 for rotation therewith. Adjustment of the valve piston 2 controls the flow of oil from a pressure pump 12 to the hand-operated gear pump 13 and from pump 13 to one of two opposing pressure chambers of an operating piston cylinder 14. The operating piston cylinder 14 is preferably supported on the steering axle of the vehicle with which the steering mechanism is associated and engages a steering linkage gear or lever 29 associated with the vehicle. Pump 12 aforementioned which is driven by the vehicle engine, draws oil from a reservoir tank 15. Pressure relief valve 16 limits the discharge pressure of the pump 12. Secondary pressure responsive check valves 17 and 18 further limit or regulate pump operating pressure.

Operation of the steering gear mechanism hereinbefore described is generally well known and is referred to hereinafter to the extent necessary for an understanding of the invention.

When the steering wheel 6 is in its straight-ahead drive position, the valve piston 2 assumes a neutral position in which the discharge of the pressure pump 12 is directly returned to the fluid reservoir tank 15 through pump outlet passage 19 and return passages 20 and 21 in the steering gear housing as shown in FIG. 1. Any fluid in the other passages of the housing and in the gear pump 13 at that time, is in a static condition. Control passages 22 and 23 connected to the opposing pressure chambers of the piston cylinder 14, are blocked from fluid communication with valve ports 24 and 25 hydraulically connected to the hand operated gear pump 13 for the neutral position of the valve piston.

In response to turning of the steering wheel 6, the shaft 5 is rotated by means of the steering spindle 3 and torsion rod 11 and thereby imparts rotation to the rotor 4 of the hand operated gear pump 13 for operation thereof. Fluid displaced by the pump 13 as a result of such turning of the steering wheel 6 in a counterclockwise direction as viewed in FIG. 1, for example, is conducted through the plate cam 9 to valve port 24 and through control passage 22 to one chamber of the operating cylinder 14. The steering load on the piston of the operating cylinder 14 produces a back pressure to resist rotation of the rotor 4. Accordingly, angular rotation of the steering spindle 3 becomes greater than that of the rotor 4 and the valve piston 2 occasioned by torsional twist of the torsion rod 11. The resulting relative angular rotation imparts axial movement to the valve piston because the driver pin 10 fastened to the steering spindle is an engagement with the diagonal groove formed in the valve piston 2. After the valve piston is axially shifted, upwardly as viewed in FIG. 1, in response to turning of the steering wheel 6 in a counterclockwise direction, the control passage 26 is opened so as to conduct fluid to the suction side of the hand operated gear pump 13 from the engine driven pump 12. The fluid flows then from the discharge side of of the pump 13 through the passages 24 and 22 to one of the chambers of the operating cylinder 14. The other of the chambers of the operating cylinder is then connected to the return line by opening of a valve passage between conduits 23 and 21. Reverse fluid flow paths are established by the control valve with respect to the operating cylinder 14 in response to turning of the steering wheel 6 in a clockwise direction.

Figure 2:
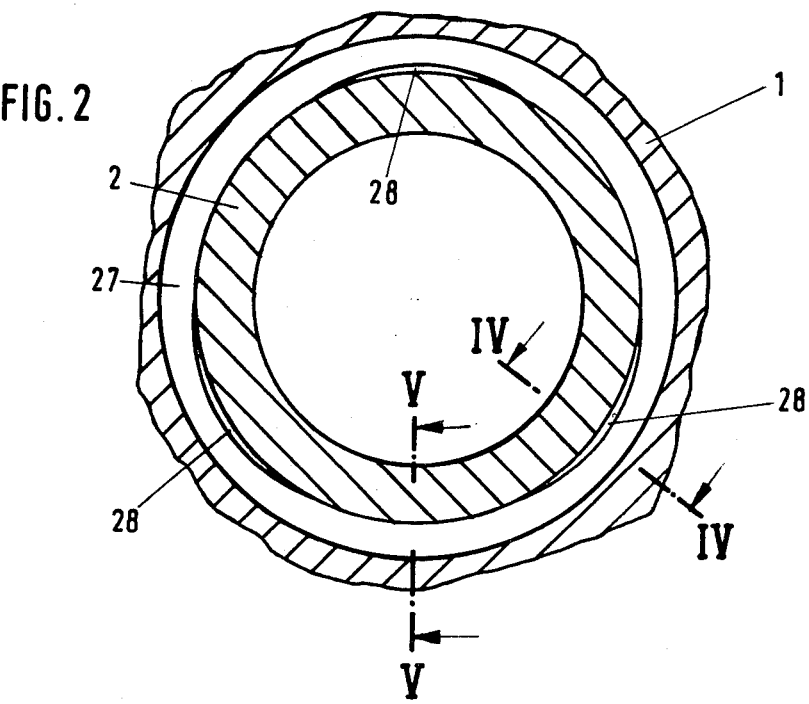
FIG. 2 is a transverse section view through the steering mechanism shown in FIG. 1 at one axial location illustrating one of the passage bridging cavities thereof in accordance with one embodiment.
Figure 3:
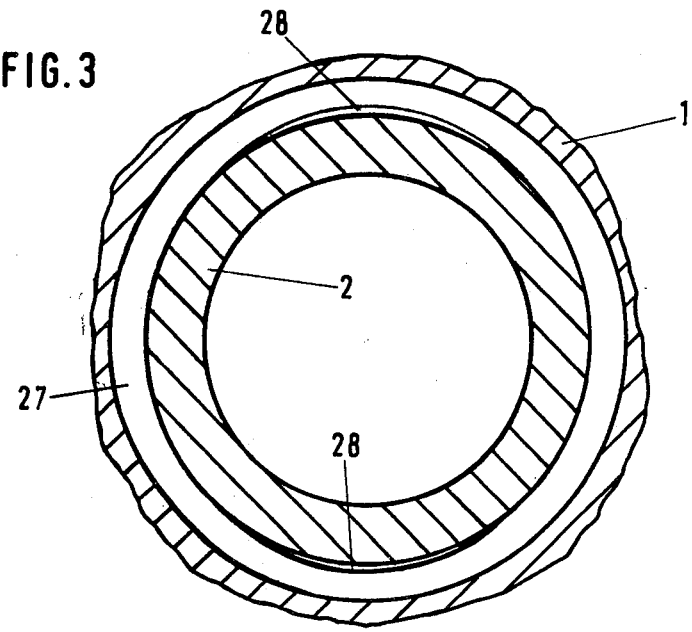
FIG. 3 is a transverse section view similar to that of FIG. 2, but showing another embodiment of the passage bridging cavity.
Figure 4:
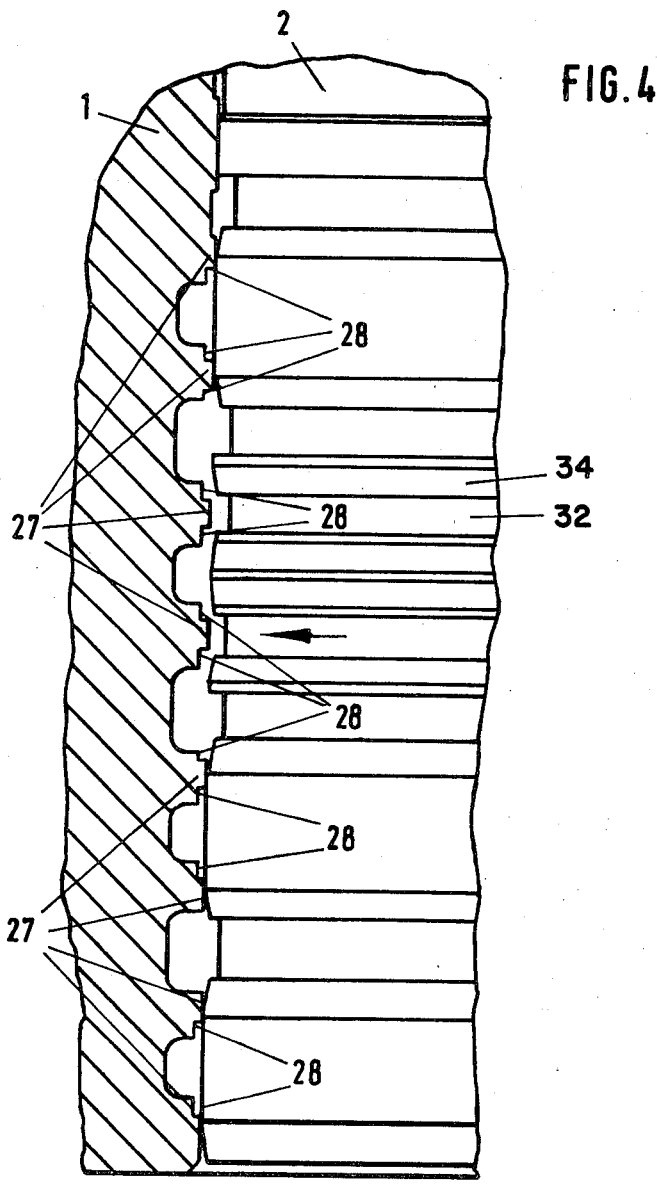
FIG. 4 is a partial side section view taken substantially through a plane indicated by Section IV—IV in FIG. 2.

Passage bridging cavities 27 in the form of annular grooves are formed in the steering gear housing between high and low pressure regions and cooperate with annular grooves 32 in the outer cylindrical surface of the valve piston to form valve edges for controlling the distribution of fluid as shown in FIGS. 4 and 5. As shown in FIGS. 2 and 3, each of the cavities 27 is provided with recesses 28 on the outer periphery of the valve piston 2 through which fluid is conducted. In the embodiment shown in FIG. 2, three of such recesses 28 are uniformly distributed over the periphery whereas in FIG. 3, two recesses 28 are provided.

Referring in particular to FIGS. 4 and 5, it will be apparent that each of the cavities 27 is sealed at opposite axial sides thereof except at the spaced angular valve edge locations at which the recesses 28 are disposed. In order to maintain operating characteristics unchanged as compared to prior steering valve arrangements, the groove bevels 34 are appropriately dimensioned. FIG. 6 illustrates the spaced angular relationship between recesses 28 at the opposite axial sides of each cavity 27 for cooperation with adjacent angular grooves 32 to form the valve edges. The recesses 28 are precisely dimensioned by plunge milling such as broaching or by an eccentric turning technique. Other methods of production may also be possible.

What is claimed is:

1. In a hydrostatic mechanism having a valve piston (2), a housing (1) mounting the valve piston for axial and rotational displacement, said housing and valve piston being provided with confronting annular grooves enclosing an annular space, a passage bridging cavity (27) formed in the housing and extending from opposite sides of the annular grooves to form valve passages through which flow of pressurized fluid to and from said annular space is conducted with a predetermined flow control, the improvement residing in precisely dimensioned means for limiting said valve passages to circumferentially spaced locations about the valve piston at said groove (32) therein while maintaining said predetermined flow control, said precisely dimensioned means comprising recesses (28) provided on both of the axial sides of the cavity, the recesses on the respective axial sides being angularly spaced from each other about the periphery of the valve piston.

2. The improvement as defined in claim 1 wherein only said recesses in the cavity are precisely dimensioned to conduct said flow.

* * * * *